(12) United States Patent
Sasaki et al.

(10) Patent No.: US 9,187,339 B2
(45) Date of Patent: Nov. 17, 2015

(54) ORGANIC SOLVENT DISPERSION CONTAINING FLAKY TITANIUM OXIDE, METHOD FOR PRODUCTION OF THE DISPERSION, TITANIUM OXIDE FILM USING THE DISPERSION, AND METHOD FOR PRODUCTION OF THE TITANIUM OXIDE FILM

(75) Inventors: Takayoshi Sasaki, Tsukuba (JP); Yasuo Ebina, Tsukuba (JP); Hirofumi Taniguchi, Yokkaichi (JP); Yusuke Uesusuki, Yokkaichi (JP)

(73) Assignees: ISHIHARA SANGYO KAISHA, LTD., Osaka (JP); INDEPENDENT ADMINISTRATIVE INSTITUTION NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 1292 days.

(21) Appl. No.: 12/676,626

(22) PCT Filed: Sep. 4, 2008

(86) PCT No.: PCT/JP2008/065989
§ 371 (c)(1),
(2), (4) Date: Apr. 22, 2010

(87) PCT Pub. No.: WO2009/031622
PCT Pub. Date: Mar. 12, 2009

(65) Prior Publication Data
US 2010/0221518 A1 Sep. 2, 2010

(30) Foreign Application Priority Data

Sep. 7, 2007 (JP) .................................. 2007-232653

(51) Int. Cl.
*B32B 15/08* (2006.01)
*C09D 5/00* (2006.01)
(Continued)

(52) U.S. Cl.
CPC ............... *C01G 23/04* (2013.01); *B01J 35/004* (2013.01); *B01J 37/0219* (2013.01);
(Continued)

(58) Field of Classification Search
USPC .............. 428/220, 702; 106/287.19; 427/595, 427/404; 524/413; 502/150
See application file for complete search history.

(56) References Cited

U.S. PATENT DOCUMENTS 4,086,100 A * 4/1978 Esselborn et al. ............ 106/417
4,598,015 A * 7/1986 Panush .......................... 428/324
(Continued)

FOREIGN PATENT DOCUMENTS

EP 1 033 347 A1 9/2000
EP 1033347 A1 * 9/2000
(Continued)

*Primary Examiner* — Tahseen N Khan
(74) *Attorney, Agent, or Firm* — Paul E. White, Jr.; Manelli Selter PLLC

(57) ABSTRACT

Disclosed is an organic dispersion comprising a flaky titanium oxide particle having a high crystallinity and high light permeability contained in an organic solvent. The dispersion can be prepared by a method comprising preparing an aqueous dispersion of a flaky titanium oxide particle containing an organic cation, centrifuging the aqueous dispersion to produce a precipitate, and adding the precipitate to an organic solvent, or a method comprising lyophilizing the aqueous dispersion to produce a lyophilized material and mixing the lyophilized material to an organic solvent. When the organic dispersion is used, it becomes possible to form a film comprising a monolayer of a titanium oxide nanosheet densely arranged therein by such a simple manner that the dispersion is coated on a base material and drying the dispersion. The film thus produced has a photocatalytic activity and a superhydrophilic property.

36 Claims, 5 Drawing Sheets

(51) Int. Cl.
  *B05D 3/06*  (2006.01)
  *B05D 1/36*  (2006.01)
  *C08K 3/22*  (2006.01)
  *B01J 31/02*  (2006.01)
  *B32B 15/04*  (2006.01)
  *C01G 23/04*  (2006.01)
  *B01J 35/00*  (2006.01)
  *B82Y 30/00*  (2011.01)
  *C01G 23/00*  (2006.01)
  *C01G 23/047*  (2006.01)
  *C09C 1/36*  (2006.01)
  *C09D 5/32*  (2006.01)
  *C09D 7/12*  (2006.01)
  *C09D 17/00*  (2006.01)
  *G02B 5/20*  (2006.01)
  *B01J 37/02*  (2006.01)
  *B01J 37/32*  (2006.01)

(52) U.S. Cl.
  CPC ............ *B01J 37/0244* (2013.01); *B82Y 30/00* (2013.01); *C01G 23/005* (2013.01); *C01G 23/047* (2013.01); *C09C 1/3607* (2013.01); *C09D 5/32* (2013.01); *C09D 7/1291* (2013.01); *C09D 17/007* (2013.01); *G02B 5/208* (2013.01); *B01J 37/0215* (2013.01); *B01J 37/32* (2013.01); *C01P 2002/84* (2013.01); *C01P 2004/03* (2013.01); *C01P 2004/04* (2013.01); *C01P 2004/20* (2013.01); *C01P 2004/22* (2013.01); *C01P 2004/62* (2013.01); *C01P 2004/64* (2013.01); *C01P 2004/84* (2013.01); *C01P 2006/60* (2013.01); *C08K 3/22* (2013.01)

(56) References Cited

U.S. PATENT DOCUMENTS

| 4,677,137 A | * | 6/1987 | Bany et al. ................. 522/31 |
| 7,534,516 B2 | * | 5/2009 | Howard ..................... 429/494 |
| 2001/0024718 A1 | * | 9/2001 | Sasaki et al. ................. 428/325 |

FOREIGN PATENT DOCUMENTS

| JP | 11-329001 A | 11/1999 |
| JP | 2001-270022 A | 10/2001 |
| JP | 2002-265223 | 9/2002 |
| JP | 2002-265223 A | 9/2002 |
| JP | 2004-255684 A | 9/2004 |
| JP | 2005-028575 A | 2/2005 |
| JP | 2005-220001 A | 8/2005 |
| JP | 2005-220001 A | 8/2005 |
| JP | 2006-206426 A | 8/2006 |
| WO | WO 99/11574 A1 | 3/1999 |

\* cited by examiner

ORGANIC SOLVENT DISPERSION CONTAINING FLAKY TITANIUM OXIDE, METHOD FOR PRODUCTION OF THE DISPERSION, TITANIUM OXIDE FILM USING THE DISPERSION, AND METHOD FOR PRODUCTION OF THE TITANIUM OXIDE FILM

This application is the national phase of international application PCT/JP2008/065989 filed 4 Sep. 2008, which designated the U.S.

TECHNICAL FIELD

The present invention relates to a dispersion comprising an organic solvent and flaky titanium oxide particles, in particular, titanium oxide nanosheets dispersed therein, and a method for production of the dispersion. Furthermore, the invention relates to a titanium oxide film that uses the organic solvent dispersion and a method for production of the same. Still furthermore, the invention relates to a use of the titanium oxide film, in particular, a use as a photocatalyst.

BACKGROUND ART

A flaky titanium oxide particle has a shape relatively large in the ratio of a width and a length to a thickness thereof. For example, particles in which a thickness thereof is about 0.5 to 100 nm, and a width and a length are about 0.1 to 500 μm are known. Furthermore, there are flaky titanium oxide particles a thickness of which is made thinner to 10 nm or less and still thinner from 0.5 to 1 nm. Such a flaky titanium oxide particle is called a titanium oxide nanosheet. Such flaky titanium oxide particles are used in the same uses as known titanium oxide, for example, a white pigment, a photocatalyst, a catalyst, a catalyst carrier, an adsorbent and the like, a UV-ray shielding agent blended in sunscreen cosmetics, a paint, a film and the like, a filler for plastic, rubber and the like, a charge control agent for a toner and the like, a viscosity controlling agent for a paint, an ink and the like, an additive to a solid lubricant, a friction controller to a friction material, a synthesis material of fine ceramic or the like. In particular, when the titanium oxide nanosheet is used, a thin layer can be formed; accordingly, the titanium oxide nanosheet can be preferably used, by forming a titanium oxide film on a base material, as a photo-functional material such as a UV-ray shielding agent, a photocatalyst or a light reflection prevention agent. Furthermore, when titanium oxide nanosheets are blended in plastic, mechanical strength, heat resistance, a gas barrier property and the like can be improved.

As to an organic solvent dispersion obtained by dispersing flaky titanium oxide particles, JP 2006-206426A discloses that when a compound which forms organic cations, a titanium source and an organic solvent are mixed, an organic solvent dispersion of organic cation-containing layered titanate nanosheets can be obtained. Furthermore, JP 2005-220001A discloses a metal oxide thin film-forming coating solution in which a layered metal oxide is brought into contact with an alkyl amine or an alkyl ammonium compound having 6 or less carbon atoms in total in an organic polar solvent to expand an interlayer distance by intercalation, followed by adding a shearing force to cleave, and thereby metal oxide nanosheets having a thickness of 1 nm or less are formed.
Patent Document 1: JP 2006-206426A
Patent Document 2: JP 2005-220001A

DISCLOSURE OF THE INVENTION

Problems to be Solved by the Invention

In Example 2 of Patent Document 1, a titanium source of titanium tetraisopropoxide was gradually dropped in a mixed solvent of dimethyloctylamine, water and isopropyl alcohol and thereby a colorless transparent solution containing layered titanate was prepared. From the description that the solution was a colorless transparent solution, the resulting layered titanate was dissolved and crystalline titanium oxide was not present. Furthermore, in Example 7 of Patent Document 2, it was said that in place of $MoO_3$ in Example 1, $H_xTi_{2-x/4}O \cdot nH_2O$ was used. When 1 mL of hexylamine was added to 0.1 g of $H_xTi_{2-x/4}O \cdot nH_2O$ the same as Example 1, a molar ratio of hexylamine/titanium was excessive; accordingly, a yield of titanium oxide nanosheets was very low and almost all was in a state of layered titanate. Furthermore, when layered titanate was delaminated, the layered titanate was processed via processes difficult to industrially perform such as cooling with a liquid nitrogen and sealing after vacuum depressurization. Furthermore, the layered titanate was not delaminated by only stirring with a stirrer. Accordingly, an ultrasonic treatment of at least 6 hrs, depending on the case, a longer time equal to 1 week or more is necessary. That is, there are problems in Example 7 of Patent Document 2.

On the other hand, as a method for preparing a film where titanium oxide nanosheets are densely arranged in a monolayer (a densely-packed monolayer film), a method where a layer-by-layer assembly (method) and an ultrasonic treatment are combined, a Langmuir-Blodgett method and the like are known. However, these methods are difficult to form a large film from the viewpoint of apparatus and not industrially suitable. Furthermore, in a known aqueous dispersion obtained by dispersing titanium oxide nanosheets, according to various influences such as a surface tension, the familiarity with a base material is poor; accordingly, it is difficult to coat a base material and thereby a densely-packed monolayer film could not be obtained.

In this connection, the present invention provides an organic solvent dispersion in which flaky titanium oxide particles are dispersed and a method for production thereof, which are industrially advantageously performed and have a high yield. Furthermore, the invention provides a titanium oxide film that can be industrially advantageously produced and applied to a wide range of base materials, in particular, a film in which titanium oxide nanosheets are arranged densely in a monolayer (a densely-packed monolayer film), a titanium oxide film in which the densely-packed monolayer films are stacked, and a method for production thereof. Furthermore, applications that use the titanium oxide film are provided.

Means for Solving the Problems

The present inventors, after studying hard to obtain a dispersion in which flaky titanium oxide particles are dispersed in an organic solvent, found that when an aqueous dispersion of flaky titanium oxide particles containing organic cations is prepared in advance and precipitates obtained by centrifuging the aqueous dispersion are added to an organic solvent, flaky titanium oxide particles can be relatively simply dispersed in the organic solvent, and when, after an aqueous dispersion of flaky titanium oxide particles containing organic cations is freeze-dried, the resulting freeze-dried substance is mixed with an organic solvent, a similar dispersion can be obtained.

It was found that since the organic solvent dispersion contains flaky titanium oxide particles that are prepared in advance in an aqueous solvent and have high crystallinity and in particular a thickness such thin as from 0.5 to 10 nm, an absorption of UV-light is shifted toward a shorter wavelength side, no optical absorption peak is present on a wavelength side higher than that, and thereby light transparency is high; furthermore, when an organic solvent dispersion containing flaky titanium oxide particles obtained by the method is used, a titanium oxide film can be readily obtained, in particular, a film where nanosheets are densely arranged in a monolayer can be obtained by such a simple method that a base material is coated with the organic solvent dispersion of titanium oxide nanosheets and dried; and furthermore the titanium oxide film has a photocatalytic function and a superhydrophilic property. Thereby, the invention was completed.

That is, the present invention provides (1) An organic solvent dispersion, comprising an organic solvent; and flaky titanium oxide particles dispersed therein, wherein the flaky titanium oxide particles have, in a UV-visible absorption spectrum, an optical absorption peak in the wavelength range of 250 to 280 nm and no optical absorption peak in the wavelength range of 300 to 800 nm, (2) a method for production of an organic solvent dispersion of flaky titanium oxide particles, characterized in that the method comprises centrifuging an aqueous dispersion of flaky titanium oxide particles containing organic cations and then mixing the resulting precipitates with an organic solvent to disperse the precipitates therein, (3) a method for production of an organic solvent dispersion of flaky titanium oxide particles, characterized in that the method comprises freeze-drying an aqueous dispersion of flaky titanium oxide particles containing organic cations and then mixing the resulting freeze-dried substance with an organic solvent to disperse the freeze-dried substance therein, (4) a titanium oxide film, characterized in that the film is formed with the organic solvent dispersion, (5) a method for production of a titanium oxide film, characterized in that the method comprises coating a base material with the organic solvent dispersion and then forming a film at a temperature in the range of 5 to 500° C., (6) a multilayer film of a titanium oxide film formed with the organic solvent dispersion and a polymer film, (7) a method for production of a multilayer film of a titanium oxide film and a polymer film, characterized in that the method comprises alternately coating a base material at least once with the organic solvent dispersion and a polymer solution, and (8) a functional material, a photocatalytic material, a superhydrophilic material and the like, comprising the titanium oxide film.

Advantages of the Invention

According to an organic solvent dispersion of the invention, crystalline flaky titanium oxide particles can be dispersed stably for a long time in an organic solvent. Accordingly, flaky titanium oxide particles can be used in various uses and can be blended in a paint, an ink, a plastic, a rubber, a lubricant, a friction material and the like more advantageously than the flaky titanium oxide particles in an aqueous dispersion, and thereby applications of the flaky titanium oxide particles can be enlarged. Furthermore, when an organic solvent is used as a liquid media, the flaky titanium oxide particles have an affinity for a base material and thereby the base material can be coated with the particles; accordingly, a titanium oxide film, in particular, a densely-packed monolayer film of titanium oxide nanosheets, a titanium oxide film obtained by stacking the densely-packed monolayer films, a multilayer film of a titanium oxide film and a polymer film and the like can be obtained. Furthermore, such titanium oxide film can be formed at low temperatures by using an organic solvent and thereby can be applied to a base material sensitive to a temperature.

Because an absorption of UV-light is shifted toward the side of a shorter wavelength of 250 to 280 nm and no optical absorption peak is present in the wavelength range of 300 to 800 nm, transparency to visible light is high. Accordingly, examples of specific uses include transparent materials. Furthermore, since the UV-light absorption in the wavelength range of 250 to 280 nm is high, the flaky titanium oxide particles can be used in various uses such as a photocatalyst, a UV-shielding agent, a transparent material, an antireflection material or a gas barrier material. In particular, when the flaky titanium oxide particles are used as a photocatalytic material, various effects such as an antifouling property, an antifogging property, or a superhydrophilic property are available. Furthermore, when the flaky titanium oxide particles are blended with a resin such as plastic, the mechanical strength and the like can be added.

Furthermore, an organic solvent dispersion of the invention is obtained either by centrifuging an aqueous dispersion of flaky titanium oxide particles containing organic cations or by freeze-drying and then mixing with an organic solvent; accordingly, an organic solvent dispersion hardly containing moisture can be relatively easily produced.

Furthermore, by a relatively simple method involving coating a base material with the organic solvent dispersion and then forming a film at a temperature in the range of 5 to 500° C. and preferably room temperature to 500° C., a titanium oxide film can be produced.

BEST MODE FOR CARRYING OUT THE INVENTION

The invention is a dispersion obtained by dispersing flaky titanium oxide particles in an organic solvent, wherein the dispersion contains flaky titanium oxide particles that have, after the concentration of the flaky titanium oxide is controlled to about 0.0016 g/L in terms of $TiO_2$, an optical absorption peak in the wavelength range of 250 to 280 nm and no optical absorption peak in the wavelength range of 300 to 800 nm in a UV-visible absorption spectrum obtained by measuring absorbance in the wavelength range of 200 to 800 nm with a spectrophotometer (U-4000, manufactured by Hitachi High-Technologies Corporation). An optical absorption peak in the wavelength range of 250 to 280 nm may show, in some cases, a shoulder peak without showing a distinct optical absorption peak owing to existence of organic cations described later.

A flaky titanium oxide particle generally includes what is called a planar particle, a sheet particle and a flaky particle. The flaky titanium oxide has crystallinity. However, when the flaky titanium oxide has a monolayer structure (thickness: about 0.5 to 1 nm), because the amount of crystals in a height direction (c-axis direction) is small, a crystal structure thereof cannot be identified whether it is an A type (anatase type) or a R type (rutile type) crystallographically. When the flaky titanium oxide has a sufficient thickness (thickness: 1 nm or more), a variety of structures are confirmed. The flaky titanium oxide having a lepidocrocite crystal structure is preferable.

As the flaky titanium oxide, crystalline titanium oxide represented by $Ti_{2-x/3}O_4^{(4x/3)-}$ (in the formula, x is from 0.57 to 1.0) is preferable. Specifically, the crystalline titanium oxide represented by $Ti_{1.81}O_4^{0.76-}$ to $Ti_{1.67}O_4^{1.33-}$ is more preferable. The size of the flaky titanium oxide can be appropriately controlled by adjusting production conditions of flaky titanium oxide particles, delaminating conditions and the like, which will be described later. When flaky titanium oxide particles are too large in size, the flaky titanium oxide particles settle out by their own weight, so the concentration thereof becomes partially high in a container bottom, and thereby flocculation tends to occur. Accordingly, when a size is defined by a length (the longest width) and a width (the shortest width) of a flake plane of flaky titanium oxide and a thickness in a vertical direction relative to the flake plane, for example, flaky particles having a width and a length of about 0.1 to 500 μm and a thickness of about 0.5 to 100 nm are preferable from the viewpoint of dispersability and flaky particles having a width and a length of about 0.1 to 30 μm and a thickness of about 0.5 to 50 nm are more preferable. Furthermore, the thickness of the flaky titanium oxide particle is preferably thinner because a thin film can be readily prepared therewith. That is, a nanosheet having a thickness in the range of 0.5 to 10 nm is preferable, a nanosheet having a thickness in the range of 0.5 to 2 nm is more preferable, and a nanosheet having a thickness in the range of 0.5 to 1 nm is still more preferable. The ratio of length (the shortest width)/thickness is preferably 10 or more and more preferably 30 or more. Furthermore, a surface of a flake defined by the length and the width of a flaky titanium oxide particle is preferably smooth, and, specifically, the distance between a protrusion and a recess of a surface of the flake is more preferably 1 nm or less. The shape and the size of a flake can be observed with a scanning probe microscope.

Organic cations described later are preferably contained in flaky titanium oxide particles. In the case, the flaky titanium oxide particles are readily dispersed owing to the charge repulsion between the organic cations. However, when the content of organic cations is too much, on the contrary, the flaky titanium oxide particles flocculate in some cases; accordingly, the content of organic cations is preferably in the range of 0.05 to 3 equivalent weights, more preferably in the range of 0.1 to 3 equivalent weights and still more preferably 0.9 to 1.5 equivalent weights based on titanium (Ti) contained in flaky titanium oxide. As the organic cations, quaternary ammonium ions are preferable, and quaternary ammonium ions having 9 or more carbon atoms in total such as tetrabutyl ammonium ion are more preferable. When quaternary ammonium ions having 9 or more carbon atoms in total are contained, the flaky titanium oxide particles are made dispersible also in many organic solvents. Furthermore, a surface of a flaky titanium oxide particle may be coated with an organic compound such as a known surfactant or a coupling agent or an inorganic compound such as silica or alumina from the viewpoint of dispersability to organic solvents, affinity with a resin and the like.

The content of flaky titanium oxide particles in an organic solvent dispersion is appropriately controllable. The content in terms of $TiO_2$ is, preferably 0.001% by weight or more, more preferably 0.01% by weight or more, more preferably 0.02% by weight or more, more preferably 0.05% by weight or more and still more preferably 0.1% by weight or more. When the content thereof is too large, a volume that one flaky titanium oxide particle can occupy becomes smaller, and thereby the flaky titanium oxide particles are likely to flocculate and then settle out. Accordingly, the content in terms of $TiO_2$ is preferably 10% by weight or less and more preferably 1.0% by weight or less. From what was mentioned, the content of flaky titanium oxide particles is, in terms of $TiO_2$, more preferably 0.001 to 10% by weight, more preferably 0.01 to 10% by weight, more preferably 0.02 to 10% by weight, still more preferably 0.05 to 10% by weight, still more preferably 0.05 to 1.0% by weight and still more preferably 0.1 to 1.0% by weight.

An organic solvent can be appropriately selected depending on use. However, an organic solvent preferably has a dielectric constant of 5 or more because in that case the flaky titanium oxide particles are readily dispersed. An organic solvent having a dielectric constant of 10 or more is more preferable. As such an organic solvent, at least one selected from the group consisting of acetonitrile (dielectric constant: 37, boiling point: 82° C.), methanol (dielectric constant: 33, boiling point: 65° C.), dimethyl sulfoxide (dielectric constant: 47, boiling point: 189° C.), ethanol (dielectric constant: 24, boiling point: 78.3° C.), 2-propanol (dielectric constant: 18, boiling point: 82.5° C.), N,N-dimethylformamide (dielectric constant: 38, boiling point: 153° C.), methyl ethyl ketone (dielectric constant: 18.5, boiling point: 80° C.), 1-butanol (dielectric constant: 17.8, boiling point: 118° C.) and formamide (dielectric constant: 109, boiling point: 210° C.) is more preferable. Furthermore, an organic solvent preferably has a low boiling point that makes it easy to dry the solvent at low temperatures, and has a boiling point of more preferably 200° C. or less, still more preferably 150° C. or less, and still more preferably 100° C. or less.

An organic solvent dispersion of the invention hardly contains moisture and the content thereof is preferably 10% by weight or less, more preferably 5% by weight or less, still more preferably 1% by weight or less, more preferably 0.5% by weight or less, and particularly preferably 0.1% by weight or less. An organic solvent dispersion may contain a third component other than the flaky titanium oxide particles and the organic solvent, in a range that does not disturb advantages of the invention, various kinds of additives such as a resin binder, a dispersant, a surface conditioner (leveling agent, wettability improver), a pH control agent, a defoaming agent, an emulsifying agent, a colorant, a bulking agent, an antifungal agent, a hardening aid, or a viscosity improver and a filler as a third component. Specifically, examples of the resin binder include (1) inorganic binders ((a) polymerizable silicon compounds (hydrolyzable silane or hydrolysis product thereof or partial condensate thereof, liquid glass, colloidal silica, organopolysiloxane and the like), (b) metal alkoxides, and the like) and (2) organic binders (alkyd resins, acrylic resins, polyester resins, epoxy resins, fluororesins, modified silicone resins and the like). Examples of the dispersant include (1) surfactants ((a) anionic surfactants (carboxylates, sulfuric acid esters, sulfonates, phosphoric acid esters and the like), (b) cationic surfactants (alkylamine salts, quaternary ammonium salts of alkylamine, aromatic quaternary ammonium salts, heterocyclic quaternary ammonium salts and the like), (c) amphoteric surfactants (betaine type, amino acid type, alkylamine oxide, nitrogen-containing heterocyclic type and the like), and (d) nonionic surfactants (ether type, ether ester type, ester type, nitrogen-containing type and the like) and the like, (2) silicone dispersants (alkyl modified polysiloxane, polyoxyalkylene modified polysiloxane and the like), (3) phosphate dispersants (sodium phosphate, sodium pyrophosphate, sodium orthophosphate, sodium metaphosphate, sodium tripolyphosphate and the like), and (4) alkanolamines (aminomethyl propanol, aminomethyl propanediol and the like) and the like. A surface conditioner controls a surface tension of an organic solvent dispersion and then inhibits defects such as eye holes and craters. Examples thereof include acrylic surface conditioners, vinyl surface conditioners, silicone surface conditioners, fluorine surface conditioners and the like.

An organic solvent dispersion of the invention is preferable as a coating agent for coating a base material with flaky titanium oxide particles. A coating agent may include a dispersion in which flaky titanium oxide particles are dispersed in an organic solvent and a third component. The third component can be selected from various kinds of additives such as the resin binder, a dispersant, a surface conditioner (a leveling agent, a wettability improver), a pH control agent, a defoaming agent, an emulsifying agent, a colorant, a bulking agent, an antifungal agent, a hardening aid, or a viscosity improver or a filler. An additive amount of the third component such as a dispersant can be appropriately controlled. For example, in the case where the surfactant, silicone dispersant, phosphate dispersant or alkanolamines are used as a dispersant, the additive amount thereof is, relative to a weight of the flaky titanium oxide, preferably about 0.005 to 2.0% by weight and more preferably about 0.01 to 0.2% by weight. The silicone surface conditioner or the like can be used as a surface conditioner and the content thereof relative to a weight of flaky titanium oxide is preferably about 0.005 to 2.0% by weight and more preferably about 0.01 to 0.2% by weight. When a base material is coated with such a coating agent, the flaky titanium oxide particles having large width and length are aligned parallel with the base material; accordingly, a titanium oxide film having high coverage of the base material, specifically, a densely-packed titanium oxide film having coverage of 90% or more and preferably 95% or more can be prepared. In addition, a monolayer titanium oxide film that flaky titanium oxide particles overlap less, specifically, a monolayer titanium oxide film that is partially formed with a thickness of one particle without overlapping particles and is formed with a thickness of at most about 2 to 3 particles overlapping in the rest thereof can be prepared, that is, a densely-packed monolayer film comparable to a Langmuir-Blodgett film can be obtained. A thickness of a monolayer titanium oxide film is, though appropriately set depending on thicknesses of flaky titanium oxide particles, a concentration of flaky titanium oxide particles of the coating agent and the like, preferably 2 nm or less. Furthermore, by recoating with a coating agent, a stacked titanium oxide film where the monolayer titanium oxide films are stacked, for example, a stacked titanium oxide film having a thickness of 1 to 20 nm can be prepared. The content of flaky titanium oxide particles in the coating agent can be appropriately controlled. For example, the content in terms of $TiO_2$ is preferably 0.001% by weight or more, more preferably 0.01% by weight or more and particularly preferably 0.02% by weight or more. When the content is too large, flaky titanium oxide particles are prone to overlap. Accordingly, when forming a titanium oxide film, the content in terms of $TiO_2$ is preferably 1.0% by weight or less and more preferably 0.5% by weight or less. From these, the content of flaky titanium oxide particles in terms of $TiO_2$ is preferably from 0.001 to 1.0% by weight, more preferably from 0.01 to 1.0% by weight, still more preferably from 0.02 to 1.0% by weight, and particularly preferably from 0.02 to 0.5% by weight.

An organic solvent dispersion of the invention is produced either by (1) centrifuging an aqueous dispersion of flaky titanium oxide particles containing organic cations and mixing the resulting precipitates with an organic solvent and then dispersing the precipitates therein or (2) freeze-drying an aqueous dispersion of flaky titanium oxide particles containing organic cations and mixing the resulting freeze-dried substance with an organic solvent and then dispersing the freeze-dried substance therein.

When the aqueous dispersion of flaky titanium oxide particles containing organic cations is produced, for example, a method described in WO99/11574 or the like can be used. Specifically, WO99/11574 discloses for example that (1) when, after layered metal titanate such as cesium titanate, lithium potassium titanate or potassium magnesium titanate is synthesized, the resulting layered metal titanate is suspended in a water solvent. And then, an acid such as hydrochloric acid, sulfuric acid, or nitric acid is added thereto to extract metal ions, layered titanate having a lamellar structure can be obtained, (2) when, after the layered titanate produced according to the method (1) above is suspended in a liquid medium, a basic compound that is an organic cation source such as an amine compound or an ammonium compound is added thereto, flaky titanium oxide particles having a structure where an interlayer is expanded and containing organic cations can be obtained, and (3) when an interlayer is delaminated for example by shaking the flaky titanium oxide particles of which the interlayer is expanded according to the method (2) above, flaky titanium oxide nanosheets are obtained. An aqueous dispersion described in (2) where the flaky titanium oxide particles are dispersed and an aqueous dispersion described in (3) where the flaky titanium oxide nanosheets obtained by delaminating the interlayers are dispersed can be preferably used.

As a metal titanate produced in the step (1), specifically, a mixed alkali metal titanate produced, for example, as shown below is preferable. That is, alkali metal oxides $M_2O$ and $M'_2O$ (M and M', respectively, are alkali metal different from each other) or respective compounds decomposed respectively to $M_2O$ and $M'_2O$ by heating and titanium dioxide or a compound generating titanium dioxide by heating are mixed at a M/M'/Ti molar ratio of preferably 3/1/5 to 3/1/11 and sintered at a temperature of 500 to 1100° C. and preferably 600 to 900° C. In order to sufficiently forward a reaction and thereby to make a residual amount of a raw material composition less and to suppress a substance having a different composition from generating, the foregoing temperature range is preferable. The above-obtained mixed alkali metal titanate is a compound having an orthorhombic layered structure (lepidocrocite crystal structure) represented by a compositional formula $M_x[M'_{x/3}Ti_{2-x/3}]O_4$ (in the formula, M and M' each are alkali metal different from each other and x is from 0.50 to 1.0), in which a part of $Ti^{4+}$ sites in a host flame work is substituted with alkali metal ions different from ions of the alkali metal in an interlayer. Alkali metal ions represented by M and M' in the substance are active and cause an exchange reaction with other cations or an uptake by intercalation of an organic material. Accordingly, when the mixed alkali metal titanate is brought into contact with an acid aqueous solution, alkali metal ions in interlayers (M) and host flame works (M') are exchanged with hydrogen ions (existence state is hydronium ion) in a short time, and thereby, a flaky titanium oxide dispersion can be obtained efficiently and at a low production cost when the flaky titanium oxide dispersion is industrially produced. x in the compositional formula can be controlled by adjusting a mixing ratio of starting raw materials. Furthermore, in order to obtain a homogeneous compound made of a single phase, in the synthesis process, sufficient mixing is preferred and raw material powders are preferably pulverized and mixed with an automatic mortar or the like. Still furthermore, a particle diameter of layered metal titanate can be appropriately controlled by appropriately selecting a sintering temperature when layered metal titanate is produced or by adopting a so-called flux method where a flux is added before sintering, and thereby a particle diameter of flaky titanium oxide can be appropriately controlled.

Flaky titanium oxide particles are preferably produced in such a manner that, during the step (2), a basic compound that is an organic cation source preferably in the range of 0.05 to 3 equivalent weights based on hydrogens (H) contained in the layered titanate is mixed in a liquid medium, thereby hydrogens contained in the layered titanate are withdrawn and the basic compound is inserted between layers, followed by, as is described in the step (3), delaminating layers to produce flaky titanium oxide particles. When an amount of a basic compound is less than the range, hydrogen ions are not sufficiently withdrawn. On the other hand, when an amount of a basic compound is excessive, interlayer delamination becomes difficult owing to swelling. The amount thereof is more preferably 0.1 to 3 equivalent weights and still more preferably 0.9 to 1.5 equivalent weights. The amount of a basic compound is, based on titanium (Ti) contained in the layered titanate, preferably in the range of 0.05 to 3 equivalent weights, more preferably in the range of 0.1 to 3 equivalent weights and still more preferably 0.9 to 1.5 equivalent weights. The amount of a basic compound preferably satisfies both of the preferable range for hydrogen (H) and the preferable range for titanium (Ti). A part of such a basic compound is contained as organic cations in flaky titanium oxide and preferably on a surface of particles.

Examples of the basic compound include (1) quaternary ammonium hydroxide compounds (tetramethyl ammonium hydroxide, tetraethyl ammonium hydroxide, tetrapropyl ammonium hydroxide, tetrabutyl ammonium hydroxide and the like), (2) alkylamine compounds (propylamine, diethylamine and the like), (3) alkanolamine compounds (ethanolamine, aminomethyl propanol and the like) and the like. Among these, quaternary ammonium hydroxide compounds are preferable because of high reactivity and quaternary ammonium hydroxide compounds having 9 or more carbon atoms in total such as a tetrabutyl ammonium hydroxide compound are more preferable because they effectively work as dispersants of flaky titanium oxide particles after an organic solvent dispersion is formed. Examples of a liquid medium used in the step (2) include water or an organic solvent such as alcohol, or a mixture thereof and, as a liquid medium, an aqueous liquid medium mainly made of water is industrially preferable. An order of addition of layered titanate and a basic compound to a liquid medium is not particularly restricted. For example, layered titanate and a basic compound are added to water, followed by stirring to mix. Alternatively, a basic compound may be added to a slurry obtained by dispersing layered titanate in water or layered titanate may be added to an aqueous solution of a basic compound. In the next place, when stirring is continued, layers of layered titanate are delaminated and thereby flaky titanium oxide particles are obtained. A reaction temperature at this time is not particularly restricted. However, it is preferable to perform under room temperature over 1 to 20 days and thereby the layered titanate is inhibited from decomposing. Furthermore, in order to increase a degree of delaminating between layers, as is shown in the step (3), a vessel containing a solution may be shaken. When the vessel is shaken, nanosheets having a length and a width each of about 0.1 to 30 μm and a thickness of about 0.5 to 10 nm, preferably about 0.5 to 2 nm and more preferably about 0.5 to 1 nm can be produced. A shaking apparatus, a paint conditioner, a shaker or the like can be used to shake.

A flaky titanium oxide particle is represented preferably by a compositional formula $Ti_{2-x/3}O_4^{(4x/3)-}$ (in the formula, x is 0.57 to 1.0) and specifically by $Ti_{1.81}O_4^{0.76-}$ to $Ti_{1.67}O_4^{1.33-}$.

The flaky titanium oxide particle has a two dimensional structure where $TiO_6$ octahedrons are combined via edge sharing. Furthermore, since 9.5 to 17% of $Ti^{4+}$ sites is vacant, a flaky titanium oxide particle has a structure abundant in negative charges of flaky particles.

Then, a dispersion of the flaky titanium oxide particles containing organic cations, preferably an aqueous dispersion is centrifuged and thereby precipitates and a liquid medium are separated. In the centrifugation, an ordinary centrifugal device can be used. The centrifugation may be repeated twice or more to adjust a desired moisture content. Separated precipitates are mixed with an organic solvent and dispersed therein, and thereby an organic solvent dispersion is obtained. When the flaky titanium oxide particles are dispersed in an organic solvent, an ordinary disperser such as a stirrer, a colloid mill, a ball mill, or a beads mill, a shaking apparatus, a paint conditioner or a shaker can be used, and, at that time, the above third component can be added therein.

Alternatively, a dispersion of the flaky titanium oxide particles containing organic cations, preferably an aqueous dispersion is freeze-dried and thereby a freeze-dried substance is obtained. In the freeze-drying, an ordinary freeze-drying device can be used. In order to control the resulting freeze-dried substance to a desired moisture content, sublimation of ice under vacuum may be followed. Then, the resulting freeze-dried substance is mixed with an organic solvent to disperse. When the flaky titanium oxide particles are dispersed, an ordinary disperser such as a stirrer, a colloid mill, a ball mill, or a beads mill, a shaking apparatus, a paint conditioner or a shaker the same as that mentioned above can be used, and, at that time, the above third component may be added thereto.

Then, a base material is coated with the organic solvent dispersion or a coating agent, which contains the flaky titanium oxide particles, to obtain a titanium oxide film. Preferably, such a titanium oxide film has an optical absorption peak in the wavelength range of 250 to 280 nm and no optical absorption peak in the wavelength range of 300 to 800 nm in a UV-visible absorption spectrum measured in the wavelength range of 200 to 800 nm with a spectrophotometer (U-3300, manufactured by Hitachi Ltd.). Furthermore, although the thickness of a titanium oxide film can be set to an optional value by appropriately selecting a coating method, flaky titanium oxide particles can be applied also in a monolayer. The thickness of the titanium oxide film is preferably set in the range of, for example, 0.5 to 10 nm because in that case the titanium oxide film can be used in various uses. Therefore, the thickness thereof is more preferably in the range of 0.5 to 2 nm and still more preferably in the range of 0.5 to 1 nm. A material of a base material is not restricted to plastic, glass, ceramic, metal, wood, fiber and the like. On a surface of a base material, for example to improve the adhesiveness between a titanium oxide film and a base material or for example to protect the base material, a primer layer may be formed in advance, or in order to protect a titanium oxide film, a topcoat layer may be formed on a surface of the film. When a primer layer or a topcoat layer is formed, the inorganic binder, the above organic binder and the like can be used.

A preferable aspect of a titanium oxide film is a titanium oxide film having high coverage of a base material, in which the flaky titanium oxide particles are disposed arranged in parallel with the base material, specifically a titanium oxide film having the coverage of 90% or more and preferably 95% or more. Such a film that has the coverage of 90% or more is called a densely-packed film and the ratio of the coverage is confirmed by image analysis of a scanning probe microscope.

Furthermore, a state where flaky titanium oxide particles overlap less, specifically, a monolayer titanium oxide film that is partly formed with a thickness of one particle without overlapping particles and is formed with a thickness of at most about 2 to 3 particles overlapping in the rest thereof is preferable, that is, a densely-packed monolayer film comparable to a Langmuir-Blodgett film is more preferable. A titanium oxide film can be confirmed to be a monolayer film by measuring the absorbance of the titanium oxide film and by comparing the absorbance with theoretical absorbance of the titanium oxide film. Specifically, in the invention, a film having the absorbance of 80 to 120% and preferably 90 to 110% relative to theoretical absorbance (0.11) of a monolayer film of a titanium oxide is considered as a monolayerfilm. In such a densely-packed monolayer film, a transparent film having no absorption in a visible light region is obtained, that is, a film that has, in a UV-visible absorption spectrum, an optical absorption peak in the wavelength range of 250 to 280 nm and no optical absorption peak in the wavelength range of 300 to 800 nm is obtained. The thickness of a titanium oxide film can be appropriately set depending on a thickness of a flaky titanium oxide particle and the degree of overlapping of particles and in a monolayer titanium oxide film, the thickness thereof is preferably 2 nm or less.

Furthermore, when the above monolayer titanium oxide films are stacked to form a stacked titanium oxide film, the stacked titanium oxide film can be preferably variously used. The stacked titanium oxide film is a titanium oxide film having a multilayer structure where monolayer titanium oxide films are stacked. In the stacked titanium oxide film, since each of the titanium oxide films maintains a state where flaky titanium oxide particles are oriented, a property of the monolayer titanium oxide film is maintained, and since more flaky titanium oxide particles are contained owing to a multilayer structure, characteristics of the flaky titanium oxide particles can be further extracted. Each of the layers is preferably formed from the above densely-packed monolayer titanium oxide film. From this, specifically, a transparent film having no optical absorption in the visible light wavelength region is formed A film having an optical absorption peak in the wavelength range of 250 to 280 nm and no optical absorption peak in the wavelength range of 300 to 800 nm in a UV-visible absorption spectrum is preferable. A film thickness of a stacked titanium oxide film can be appropriately controlled by the number of times of stacking, preferably in the range of 1 to 20 nm and more preferably in the range of 1 to 10 nm. On the other hand, although a film thickness of about 20 nm can be obtained by one coating, in such a thick film titanium oxide film, flaky titanium oxide particles are randomly put; accordingly, it is difficult to obtain a transparent film such as that mentioned above.

As a method for coating a base material with the organic solvent dispersion or the coating agent, a general method such as a spin coat method, a spray coat method, a roller coat method, a dip coat method, a flow coat method, a knife coat method, an electrostatic coat method, a bar coat method, a die coat method, a brush coat method, a liquid dropping method, or the like can be used without particular restriction. A dip coat method can form a titanium oxide film on both sides of a base material. On the other hand, a spin coat method, a spray coat method, a roller coat method or a flow coat method can form a titanium oxide film on one side of a base material. In order to increase a film thickness, a recoating method may be performed. When an organic solvent is removed from a coated layer, a titanium oxide film is formed, and film is formed preferably at a temperature in the range of 5 to 500° C., more preferably in the range of 5 to 200° C., still more preferably in the range of 5 to 150° C., and still more preferably in the range of 5 to 100° C. In each of the temperature ranges, the lower limit thereof is preferably room temperature. Furthermore, in a state where the humidity is kept at about 50 to 100% and preferably about 60 to 95%, a film may be formed. When the film-forming conditions, specifically, conditions such as the concentration of flaky titanium oxide particles in a coating agent, film-forming temperature, humidity during film formation, and the arrangement of a base material during film formation are appropriately set and thereby the film-forming speed and the speed of vaporization of an organic solvent are appropriately controlled, a titanium oxide film having high coverage of a base material by flaky titanium oxide particles, specifically, a titanium oxide film having a coverage of 90% or more and preferably of 95% or more can be produced. Still furthermore, a state where flaky titanium oxide particles overlap less, specifically, a monolayer titanium oxide film that is partly formed with a thickness of one particle without overlapping particles and is formed with a thickness of at most about 2 to 3 particles overlapping in the rest thereof can be produced, that is, a densely-packed monolayer film comparable to a Langmuir-Blodgett film can be produced. Also the thickness of a titanium oxide film can be appropriately set depending on the thickness of a flaky titanium oxide particle and the degree of overlap of particles and is preferably 2 nm or less. Specifically, as preferable conditions, in the case where dimethyl sulfoxide is used as an organic solvent, when the concentration of the flaky titanium oxide particles is set to 0.02 to 0.1% by weight, the film-forming temperature is set to 10 to 35° C., and the humidity is set to 60% or more, a densely-packed monolayer titanium oxide film can be produced. Furthermore, in the case where N,N-dimethylformamide is used as an organic solvent, when a concentration of the flaky titanium oxide particles is set to 0.02 to 0.1% by weight, the film-forming temperature is set to 15 to 35° C., and the humidity is set to 90% or more, a densely-packed monolayer titanium oxide film can be produced. Furthermore, when a base material is obliquely or vertically put during film formation, an organic solvent flows in a downward direction and simultaneously therewith gradually evaporates from an upper portion, and thereby a film is slowly formed and an excess flaky titanium oxide overflows the base material; accordingly, a densely-packed monolayer titanium oxide film is prone to be obtained. To obliquely or vertically dispose a base material specifically means to hold a base material at an angle of 15 to 90°, preferably about 30 to 90° and more preferably about 60 to 80°. On the other hand, when a base material is horizontally (angle: 0°) disposed, a solvent dries toward a center of the base material and thereby superfluous flaky titanium oxide is gathered at a center of the base material; accordingly, it is difficult to obtain a titanium oxide film densely packed in a monolayer over an entire base material.

Furthermore, another method where a titanium oxide film is formed by the use of a photocatalytic ability of titanium oxide can be adopted. Specifically, a base material is coated with an organic solvent dispersion or a coating agent and irradiated with light having specific wavelengths which show energy equal to or more than a band gap of titanium oxide thereto. According to a film formation under light irradiation, an organic solvent can be decomposed and removed. Accordingly, in the case where a third component such as a binder is unnecessary after film formation, when an organic component is used as a third component, it can be removed without heating. Furthermore, as required, a titanium oxide film obtained by any one of the above-mentioned methods may be calcined at a temperature not in excess of heat resistance of the base material or may be calcined at a temperature of about 200 to 800° C. to increase adhesiveness.

When an operation involving coating a base material with the organic solvent dispersion or the coating agent and then forming a film at a temperature in the range of 5 to 500° C. is repeated at least twice, monolayer films of flaky titanium oxide particles can be stacked. The number of times of coating can be appropriately set. Film formation of the respective layers can be performed according to film forming conditions of the titanium oxide film described before, and the respective layers are preferably formed from a densely-packed monolayer titanium oxide film. Furthermore, as required, the stacked titanium oxide film may be calcined in accordance with heat resistance of the base material or may be calcined at a temperature of about 200 to 800° C. to increase adhesiveness.

In the invention, when a base material is alternately coated at least once with an organic solvent dispersion or a coating agent, which contains flaky titanium oxide particles, and a polymer solution, a film in which a titanium oxide film and a polymer film are alternately stacked can be produced. This is a method called a layer-by-layer assembly (method) where an operation where a base material is coated, preferably dip coated, with a polymer solution of a cationic polymer or the like such as polyethyleneimine, a polydimethyldiallyl ammonium chloride or a polyallylamine hydrochloride and dried and thereby a polymer layer is formed, and thereafter coated, preferably dip coated, with a flaky titanium oxide organic solvent dispersion or a coating agent and dried, and thereby a titanium oxide film is formed is repeated. A coated substance is dried at a temperature preferably in the range of 5 to 200° C., more preferably in the range of 5 to 150° C., and still more preferably in the range of 5 to 100° C. to remove an organic solvent from the coated substance. The lower limit of each of the temperature ranges is preferably room temperature. According to the method, flaky titanium oxide particles are adsorbed by a polymer layer; accordingly, a titanium oxide film having a thick film thickness is readily obtained. A film thickness of each of a titanium oxide film and a polymer film can be appropriately set and both have a thickness, for example, preferably in the range of 0.5 to 20 nm, more preferably in the range of 0.5 to 10 nm, still more preferably in the range of 0.5 to 2 nm and particularly preferably in the range of 0.5 to 1 nm.

When, by the use of the layer-by-layer assembly (method), a dispersion of a flaky inorganic compound other than titanium oxide is used in place of the polymer solution, and a base material is alternately coated at least once with the dispersion of the flaky inorganic compound other than titanium oxide and an organic solvent dispersion or a coating agent, which contains flaky titanium oxide, followed by removing a liquid medium from the coated substance, a multilayer film can be produced. In this case, since both are an inorganic compound, a multilayer film may be formed by heating. The film is dried at a temperature preferably in the range of 5 to 500° C., more preferably in the range of 5 to 200° C., still more preferably in the range of 5 to 150° C. and particularly preferably in the range of 5 to 100° C. The lower limit of each of the temperature ranges is preferably room temperature. Examples of the inorganic compound include tungsten oxide, manganese oxide and the like. A flaky tungsten oxide dispersion, a flaky manganese oxide dispersion and the like can be used to form an inorganic compound film thereof and these are preferably an organic solvent dispersion. A film thickness of each of a titanium oxide film and an inorganic compound film can be appropriately set and, for both the titanium oxide film and the inorganic compound film, a film thickness is set, for example, preferably in the range of 0.5 to 20 nm, more preferably in the range of 0.5 to 10 nm, still more preferably in the range of 0.5 to 2 nm and particularly preferably in the range of 0.5 to 1 nm. Furthermore, another multilayer film is a multilayer film of a titanium oxide film, a polymer film and an inorganic compound film produced by alternately coating a base material at least once with three of an organic solvent dispersion containing flaky titanium oxide particles, a polymer solution and a dispersion of a flaky inorganic compound other than titanium oxide. When the multilayer film is heated and the polymer film is decomposed and removed, a multilayer film of the titanium oxide film and the inorganic compound film can be produced.

A base material on which the titanium oxide film or the multilayer film is formed can be used in various uses. It can be used for functional materials including, for example, a UV-shielding agent, a transparent material, an antireflection material, a photocatalytic material, a photochromic material, an electrochromic material, a gas barrier material and the like. When the base material is used in these uses, flaky titanium oxide or the like may be applied in accordance with a conventional form, supporting state and mixing ratio. When the flaky titanium oxide is used as, for example, a photocatalyst, it is irradiated with light having a wavelength having energy equal to or more than a band gap of titanium oxide to remove a harmful material, a bad odor material, contamination and the like, and antifouling effect, antifogging effect and the like owing to a superhydrophilic effect can be made use of. An organic solvent dispersion containing flaky titanium oxide particles can be blended into a liquid resin composition such as a paint or an ink by mixing with a resin, or the liquid resin composition can be molded to form a solid resin composition such as a plastic molded body, a sheet or a film. As such resin, the resin binder, a biodegradable resin, a UV-curable resin, a thermosetting resin and the like can be appropriately used, and a blending amount of flaky titanium oxide particles, blending amounts of other additives and the like can be appropriately set.

EXAMPLES

In what follows, Examples of the invention will be shown. However, the invention is not restricted thereto.

Production Example 1

In the beginning, potassium carbonate ($K_2CO_3$), lithium carbonate ($Li_2CO_3$) and titanium dioxide ($TiO_2$) were mixed at a K/Li/Ti molar ratio of 3/1/6.5 and thoroughly pulverized. The mixture was transferred into a platinum crucible, sintered at a temperature of 800° C. for 5 hr, and thereby a white powder of mixed-alkali metal titanate was obtained.

To 1 g of the white powder, 100 $cm^3$ of 1 N hydrochloric acid was added and the solution was reacted under stirring at room temperature for 1 day. Thereafter, the solution was filtered, washed with water and dried, and thereby a powder of layered titanate compound was obtained.

Then, the powder of layered titanate compound (0.4 g in terms of $TiO_2$) was added to an aqueous solution of 0.1 L where 1 neutralization equivalent of tetrabutyl ammonium hydroxide was dissolved to an amount of $H^+$ in the layered titanate, followed by shaking with a shaker at about 150 rotations/min for 10 days, and thereby a flaky titanium oxide aqueous dispersion having a $TiO_2$ concentration of 0.4% by weight (sample a) was obtained.

Example 1

A sample a obtained in Production Example 1 was centrifuged at 15,000 rpm for 30 min with a centrifugal machine (CP 100MX, manufactured by Hitachi Koki Co., Ltd.) and thereby an almost transparent supernatant and a paste-like precipitate were separated. The transparent supernatant was discarded, the same amount of acetonitrile as the discarded solution was added, followed by lightly shaking, and thereby a dispersion was obtained. Under the same conditions, centrifugation, discarding of a transparent supernatant solution, addition of acetonitrile and dispersion were further carried out. The above-mentioned operation was performed three times in total and finally an organic solvent dispersion (sample A) of the invention having a $TiO_2$ concentration of 0.4% by weight was obtained. And, a moisture content of the organic solvent dispersion of the invention was the same as a moisture content of commercially available special grade acetonitrile (0.07% by weight).

Example 2

In the beginning, 0.1 L of sample a obtained in Production Example 1 was instantaneously frozen in liquid nitrogen by use of a freeze-drying device (FDU-830, manufactured by Tokyo Rikakikai Co., Ltd.), left under vacuum for 1 week to sublimate a solvent (ice), and thereby a freeze-dried substance was obtained. Then, 0.8 g of the resulting freeze-dried substance was added to 0.02 L of acetonitrile, followed by lightly shaking, and thereby an organic solvent dispersion (sample B) of the invention having a $TiO_2$ concentration of 0.4% by weight (moisture content: 0.07% by weight) was obtained.

Example 3

A sample a obtained in Production Example 1 was centrifuged at 15,000 rpm for 30 min with a centrifugal machine (CP 100MX, manufactured by Hitachi Koki Co., Ltd.) and thereby an almost transparent supernatant and a paste-like precipitate were separated. The transparent supernatant was discarded, the same amount of dimethyl sulfoxide as the discarded solution was added, followed by lightly shaking, and thereby an organic solvent dispersion (sample C) of the invention was obtained. In the dispersion of sample C, flaky titanium oxide having a $TiO_2$ concentration of 0.2% by weight was dispersed and a moisture content thereof was 5% by weight.

Example 4

The sample A obtained in Example 1 was diluted to 100 times with acetonitrile and dropped on a silicon wafer substrate, followed by standing still in the atmosphere at room temperature for 10 min to dry, and thereby a titanium oxide film (sample D) from which a solvent was removed was obtained.

Example 5

In a manner similar to Example 4, a sample B obtained in Example 2 was dropped on a silicon wafer substrate and a titanium oxide film (sample E) was obtained.

Example 6

To a sample C obtained in Example 3, dimethyl sulfoxide having a weight 4 times the weight of the sample C was added and thereby a 5 times-diluted sol was prepared. A silicon wafer was dip coated with the 5 times-diluted sol, then stood obliquely at an angle of 70°, followed by volatilizing a solvent at 25° C., and thereby a titanium oxide film (sample F) where flaky titanium oxide particles were adsorbed on both sides of a substrate was obtained. Furthermore, an operation was performed similarly with a quartz substrate in place of a silicon wafer and thereby a titanium oxide film (sample G) where flaky titanium oxide particles were adsorbed on both sides of a substrate was obtained.

Example 7

To a sample C obtained in Example 3, dimethyl sulfoxide having a weight 4 times the weight of the sample C was added and 0.01% by weight or 0.1% by weight of a silicone surface conditioner was further added and thereby a 5 times-diluted sol was prepared. A silicon wafer was dip coated with each of the 5 times-diluted sols, the stood obliquely at an angle of 70°, followed by volatilizing a solvent at 25° C., and thereby titanium oxide films (samples H, I) where flaky titanium oxide particles were adsorbed on both sides of a substrate were obtained.

Example 8

One side of a quartz substrate was flow coated with a 2.5 times-diluted sol obtained by adding dimethyl sulfoxide having a weight 1.5 times the weight of the sample C obtained in Example 3, the quartz substrate was obliquely stood at an angle of 70°, a solvent was volatilized in a constant temperature and constant humidity held at 25° C. and a humidity of 90%, and thereby a titanium oxide film where on one side of a substrate flaky titanium oxide particles were densely arranged was obtained. When the flow coat/film formation was repeated four times to the substrate, a titanium oxide film (sample J) where four layers of nanosheet were stuck was obtained.

Example 9

To a sample B of an organic solvent dispersion obtained in Example 2, acetonitrile was added, and thereby a 25 times-diluted solution (0.016% by weight in terms of titanium oxide) was obtained. Separately therefrom, a polydimethyldiallyl ammonium aqueous solution having a concentration of 2% by weight (hereinafter, referred to as a polymer solution) was prepared, and a quartz substrate was dipped therein. A dipped substrate was, after drying under room temperature, dipped in the 25 times-diluted solution prepared above, dried under room temperature, thereby a multilayer film sample containing a polymer film and a titanium oxide film was obtained. Subsequently, the quartz substrate was further dipped alternately in the polymer solution and the 25 times-diluted solution and dried. This operation was repeated 5 times and thereby a multilayer film of the invention (sample K) was obtained.

Comparative Example 1

When a silicon wafer was dip coated in a solution obtained by diluting the sample a obtained in Production Example 1 5 times with pure water and an attempt was made to dry it at room temperature, the substrate repelled water; accordingly, a desired titanium oxide film could not be obtained.

Comparative Example 2

The sample a obtained in Production Example 1 was diluted with pure water and thereby an aqueous dispersion having a titanium oxide concentration of 0.01% by weight was prepared.

After a silicon wafer substrate was dipped in an aqueous solution of polyethyleneimine of 2.5 g/L, a surface thereof was lightly washed with pure water and dried under room temperature. Then, the silicon wafer plate was dipped in the diluted dispersion, and a surface of the substrate was lightly washed with pure water once more, followed by drying under room temperature, and thereby a film sample (sample b) of flaky titanium oxide was obtained.

Evaluation 1

To a sample A of the organic solvent dispersion obtained in Example 1, acetonitrile was added, and thereby a 250 times-diluted (0.0016 g/L in terms of titanium oxide) sample was prepared. Absorbance of the 250 times-diluted sample was measured by use of a spectrophotometer (U-4000, manufactured by Hitachi High-Technologies Corporation). A result thereof is shown in FIG. 1. It was found that a flaky titanium oxide organic solvent dispersion of the invention had a peak around 260 nm and no peak in the wavelength range of 300 nm to 800 nm. Furthermore, it was found that since the flaky titanium oxide organic solvent dispersion exhibited almost no optical absorption in a visible light region of a wavelength of 400 nm or more, transparency was high.

In a similar manner, a sample B obtained in Example 2 was diluted to 250 times by adding acetonitrile. Absorbance thereof was then measured by use of a spectrophotometer. As a result thereof, it was confirmed to be an organic solvent dispersion that has optical characteristics that have a peak around 260 nm and no peak in the wavelength range of 300 nm to 800 nm similarly.

To an aqueous dispersion sample a prepared in Production Example 1, pure water was added, and thereby a 200 times-diluted aqueous solution was prepared. Absorbance of the aqueous solution was measured by use of a spectrophotometer (U-4000, manufactured by Hitachi High-Technologies Corporation). The result thereof is shown in FIG. 2. It was confirmed that the aqueous solution has a peak around 260 nm and no peak in the wavelength range of 300 nm to 800 nm. The result is the same as that of FIG. 1, and an organic solvent dispersion of the invention can be judged a dispersion that neither changes a band gap structure derived from flaky titanium oxide particle in an aqueous dispersion nor generates flocculate and the like.

Evaluation 2

A microscope photograph obtained by observing particles contained in a titanium oxide film (sample D) of Example 4 with a scanning probe microscope (SPA-400, manufactured by Seiko Instruments Inc.) is shown in FIG. 3 (observation area: 2 μm×2 μm). It was found from FIG. 3 that in the organic solvent dispersion (sample A) of Example 1 obtained in the invention, flaky titanium oxide particles having a width and a length of about 0.2 μm to 1.0 μm were dispersed.

Furthermore, a line plot analysis was performed to analyze a thickness of the flaky titanium oxide particles observed in FIG. 3. The result thereof is shown in FIG. 4. FIG. 4 shows a result obtained by transversally analyzing protrusions and recesses of a flake surface of the particle in an upper left of FIG. 3. From the result, since the maximum difference in height (P–V) of the flaky titanium oxide particle was 1.48 (=1.87−0.39) nm, it was found that a height from a silicon wafer substrate (corresponding to thickness) of the particle obtained in the invention was about 1.5 nm at a maximum. Furthermore, a flat portion located on a particle of FIG. 4 shows a surface state of the flaky titanium oxide particle and the protrusions and recesses thereof was within about ¼ a height of an analysis diagram; accordingly, the difference in height of surface protrusions and recesses was calculated to be within 0.37 (=1.48/4) nm and it was also found that the difference between the protrusions and the recesses of the surface of the flaky titanium oxide particle of the invention was 1 nm or less, that is, very flat.

When particles contained in the titanium oxide film (sample E) of Example 5 were observed with a scanning probe microscope, particles having the same width and the same length as those of the sample A were observed. Furthermore, when protrusions and recesses of a flake surface of the particle was analyzed, it was confirmed that the particle has a similar height (thickness) and the difference in height of the particle surface was within 1 nm, that is, the particle surface was very flat.

The arrangement of titanium oxide particles in the titanium oxide film (sample F) of Example 6 was observed with a scanning probe microscope. A microscope photograph thereof is shown in FIG. 5. From FIG. 5, it was found that in the resulting titanium oxide film, flaky titanium oxide particles having a width and a length of 500 nm to 1 μm were densely arranged. From the image analysis, it was found that a thickness of flaky titanium oxide particle was about 1 nm and a coverage of a substrate by flaky titanium oxide particles was 95%. Furthermore, the arrangement of titanium oxide in each of titanium oxide films (samples H and I) of Example 7 was observed with a scanning probe microscope, and it was found that in the resulting titanium oxide film, similarly to sample F, flaky titanium oxide particles having a width and a length of 500 nm to 1 μm were densely arranged. From the image analysis, it was found that a thickness of a flaky titanium oxide particle was about 1 nm and the coverage of the substrate by flaky titanium oxide particles was 95%.

Absorbance of the titanium oxide film (sample G) of Example 6 was measured with a spectrophotometer and a result thereof is shown in FIG. 6. It can be said to be a transparent film having a peak around 260 nm and no absorption in a visible light region. Under an assumption that a substrate is covered with one layer of titanium oxide nanosheet, absorbance around 260 nm can be theoretically calculated from a volume of a unit cell of the titanium oxide nanosheet and a molar absorption coefficient of the titanium oxide nanosheet, and theoretical absorbance when both sides of the substrate are covered with the titanium oxide nanosheet is 0.11. On the other hand, absorbance around 260 nm of FIG. 6 is about 0.1 and shows a value nearly equal to the theoretical absorbance; accordingly, the sample G can be said to be covered densely with one layer of titanium oxide nanosheet.

When the titanium oxide film (sample J) of Example 8 where four layers were stacked was prepared, every one coating and drying of a substrate, the absorbance of the substrate was measured with a spectrophotometer (U-4000, manufactured by Hitachi High-Technologies Corporation). Measurement results are shown in FIG. 7. As a stacking operation was repeated, absorbance increased by a constant amount, and, as is obvious from a graph (absorbances around 260 nm relative to the number of times of stacking) shown on a right side in FIG. 7, absorbance around 260 nm increased by about 0.06 for every stacking. As is mentioned above, the value is nearly equal to a value of theoretical absorbance when one side of the substrate is covered with titanium oxide nanosheets; accordingly, it can be said that, for every one stacking operation, one layer of a densely arranged film of titanium oxide nanosheets is stacked.

A microscope photograph of a comparative sample b of Comparative Example 2 observed with a scanning probe microscope (SPA-400, manufactured by Seiko Instruments Inc.) is shown in FIG. 8 (observation area: 2 μm×2 μm). It was confirmed that flaky titanium oxide particles having a width and a length from about 0.2 μm to 0.7 μm were present in an aqueous dispersion (sample a). In comparison with the observation result (FIG. 3) of the sample D obtained by dropping the organic solvent dispersion (sample A) of the invention on a silicon wafer in Evaluation 2, in a comparative evaluation sample (FIG. 8), an attaching method on the substrate surface was different including a cleaning process with pure water and the like; accordingly, relatively large flaky titanium oxide particles were washed away and rather smaller flaky titanium oxide particles were observed to exist. However, the particle shapes thereof including the thickness of one titanium oxide particle were considered almost the same as in FIG. 3 observed in Evaluation 2. Accordingly, it can be said that in an organic solvent dispersion of the invention, flaky titanium oxide particles contained in an aqueous dispersion, which is a precursor, are dispersed without a change in shape thereof.

Evaluation 3

When the multilayer film (sample K) of Example 9 was prepared, for every one coating of a substrate with an organic solvent dispersion and drying, the absorbance of the substrate was measured with a spectrophotometer (U-4000, manufactured by Hitachi High-Technologies Corporation). Measurement results of 5 times in total are shown in FIG. 9. It was found that the multilayer film (sample K) had a peak around 260 nm and no peak in the wavelength range of 300 nm to 800 nm. It is found that since there was almost no optical absorption in a visible light wavelength region of 400 nm or more, transparency of each of the stacked samples was high. Furthermore, since it was confirmed that a polymer solution and a polymer component used in the multilayer do not have an optical absorption around of 260 nm, an optical absorption around 260 nm is caused by a titanium oxide film. Absorbance of a peak in the respective samples increases almost quantitatively in accordance with the number of times of stacking; accordingly, it was confirmed that for every one stacking, a titanium oxide film was almost quantitatively formed.

Similarly, it was confirmed that when a multi layer film is obtained by using the sample A of the organic solvent dispersion obtained in Example 1 and a polydimethyldiallyl ammonium aqueous solution having a concentration of 2% by weight, the multilayer film had an optical absorption peak at 260 nm and no optical absorption peak in the wavelength range of 300 nm to 800 nm. A titanium oxide film also has excellent transparency. It was also confirmed that each layer obtained by stacking operation was quantitative for every one stacking operation.

Evaluation 4

The sample K of Example 9 was irradiated with a black light (wavelength: 360 nm) at an illuminance of 1 mW/cm$^2$ in the atmosphere for 168 hr and, during that time, at an appropriate interval, a contact angle with water was measured with a contact angle meter (FACE CONTACT ANGLE METER CA-D Model, manufactured by Kyowa Interface Science Co., Ltd.). The contact angle was 5° or less, that is, superhydrophilic property was developed. Furthermore, during dark storage, the superhydrophilic property was maintained; accordingly, an organic material in the atmosphere was considered to be difficult to adhere to the sample.

INDUSTRIAL APPLICABILITY

A titanium oxide film and a multilayer film of the invention are useful in functional materials such as a photocatalyst, a UV-ray shielding agent, a transparent material, an antireflection material and a gas barrier material.

Figure 1:
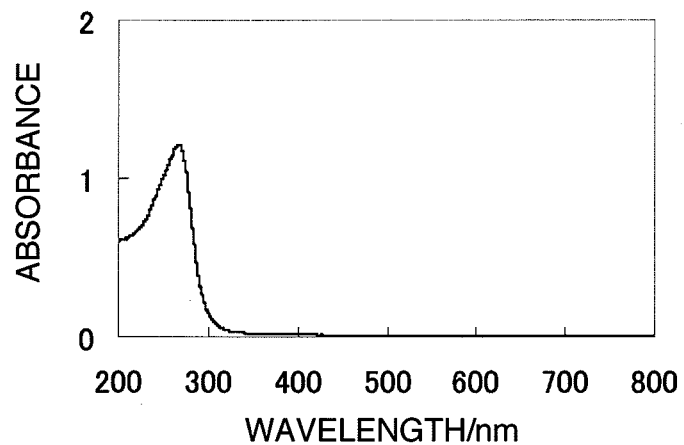
FIG. 1 is a diagram showing a measurement result of absorbance of a flaky titanium oxide organic solvent dispersion (sample A) obtained in Example 1.
Figure 2:
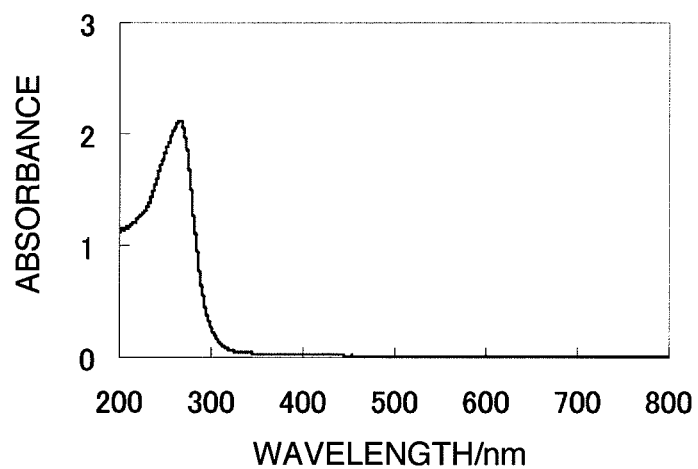
FIG. 2 is a diagram showing a measurement result of absorbance of a flaky titanium oxide aqueous dispersion (sample a) prepared in Production Example 1.
Figure 3:
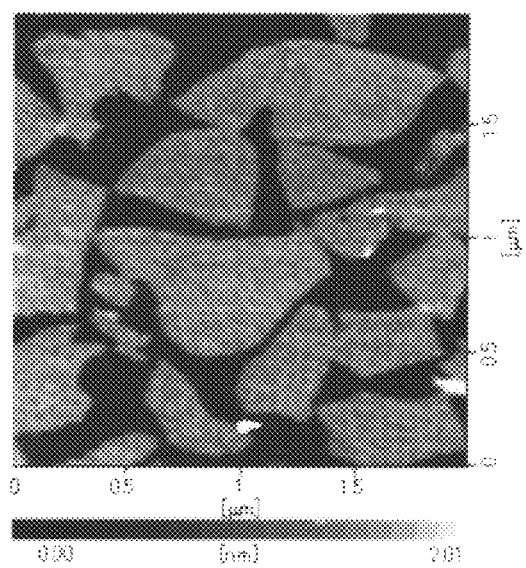
FIG. 3 is a diagram showing a scanning probe microscope photograph obtained by observing shapes of particles contained in a flaky titanium oxide organic solvent dispersion (sample A) obtained in Example 1.
Figure 4:
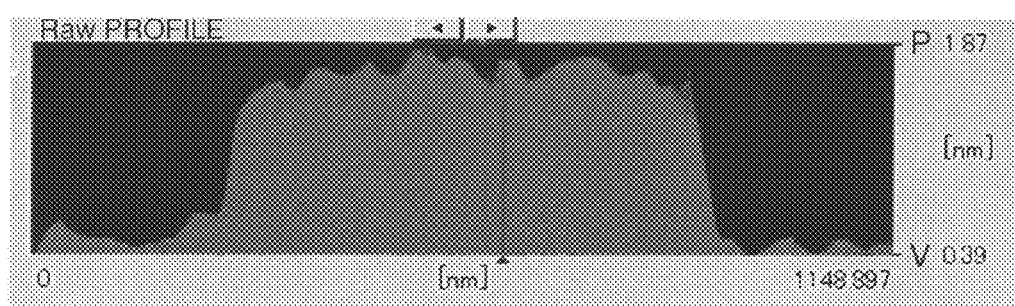
FIG. 4 is a diagram showing a height difference analysis line plot representing a thickness of a flaky titanium oxide particle in an upper left of a scanning probe microscope photograph (FIG. 3) of particles contained in a flaky titanium oxide organic solvent dispersion (sample A) obtained in Example 1 and a surface state of a flake.
Figure 5:
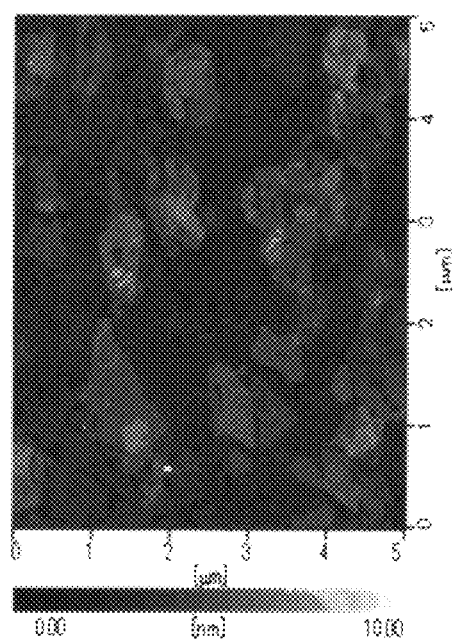
FIG. 5 is a diagram showing a scanning probe microscope photograph of a titanium oxide film (sample F) obtained in Example 6.
Figure 6:
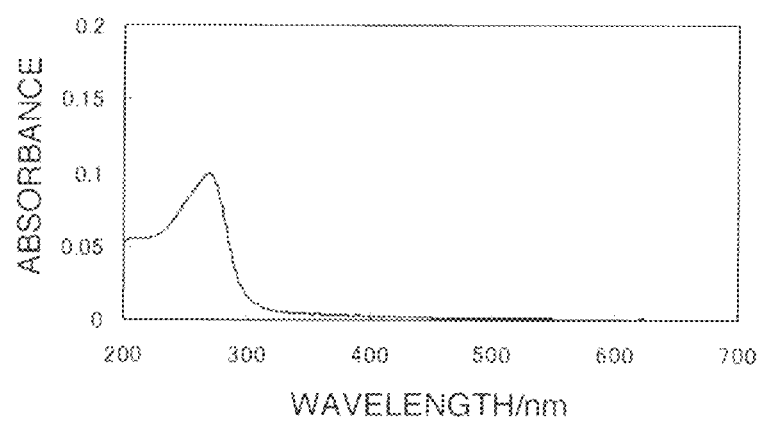
FIG. 6 is a diagram showing an absorbance measurement result of a titanium oxide film (sample G) obtained in Example 6.
Figure 7:
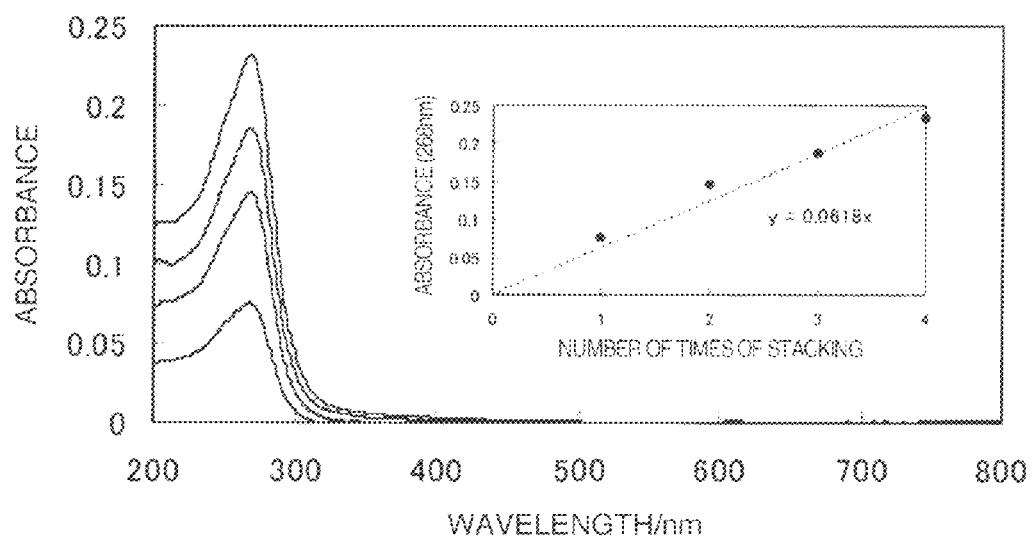
FIG. 7 is a diagram showing absorbance measurement results of the respective layers of a stacked titanium oxide film (sample J) obtained in Example 8.
Figure 8:
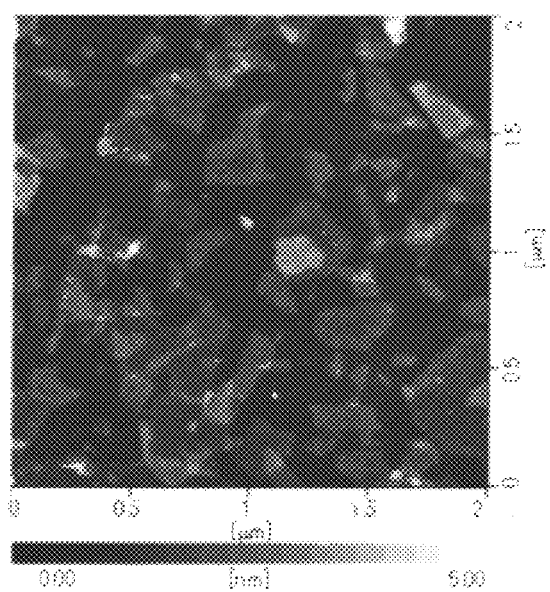
FIG. 8 is a diagram showing a scanning probe microscope photograph obtained by observing shapes of particles contained in a flaky titanium oxide aqueous dispersion (sample a) prepared in Production Example 1.
Figure 9:
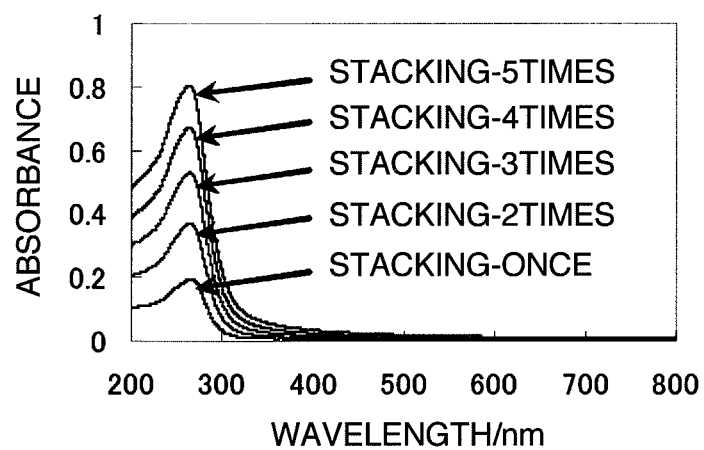
FIG. 9 is a diagram showing absorbance measurement results of a multilayer film (sample K) obtained in Example 9.

The invention claimed is:

1. An organic solvent dispersion, comprising an organic solvent and flaky titanium oxide particles dispersed therein, wherein the organic solvent dispersion has, in a UV-visible absorption spectrum, an optical absorption peak in the wavelength range of 250 to 280 nm and no optical absorption peak in the wavelength range of 300 to 800 nm.

2. The organic solvent dispersion according to claim 1, characterized in that a distance between a protrusion and a recess of a surface of the flaky titanium oxide particle is 1 nm or less.

3. The organic solvent dispersion according to claim 1, characterized in that the organic solvent is at least one selected from the group consisting of acetonitrile, methanol, dimethyl sulfoxide, ethanol, 2-propanol, N,N-dimethylformamide, methyl ethyl ketone, 1-butanol and formamide.

4. The organic solvent dispersion according to claim 1, characterized in that a moisture content thereof is 10% by weight or less.

5. The organic solvent dispersion according to claim 1, characterized in that a content of the flaky titanium oxide particles is 0.1% by weight or more.

6. A resin composition, comprising the organic solvent dispersion according to claim 1; and a resin mixed therewith.

7. A titanium oxide film, characterized in that the film is formed with an organic solvent dispersion according to claim 1.

8. The titanium oxide film according to claim 7, characterized in that the film has, in a UV-visible absorption spectrum, an optical absorption peak in the wavelength range of 250 to 280 nm and no optical absorption peak in the wavelength range of 300 to 800 nm.

9. A functional material, comprising the titanium oxide film according to claim 7.

10. A photocatalytic material, comprising the titanium oxide film according to claim 7.

11. A superhydrophilic material, comprising the photocatalytic material according to claim 10.

12. The titanium oxide film according to claim 7, characterized in that a thickness thereof is in the range of 0.5 to 10 nm.

13. The titanium oxide film according to claim 7, characterized in that a coverage of a base material with the flaky titanium oxide particles is 90% or more.

14. The titanium oxide film according to claim 13, characterized in that a thickness thereof is 2 nm or less.

15. The titanium oxide film according to claim 13, characterized in that the film is a monolayer film of the flaky titanium oxide particles.

16. A titanium oxide film, characterized in that the monolayer films of flaky titanium oxide particles according to claim 15 are stacked.

17. The titanium oxide film according to claim 16, characterized in that a thickness of the stacked film is 1 to 20 nm.

18. A multilayer film of a titanium oxide film formed with the organic solvent dispersion according to claim 1; and a polymer film.

19. A multilayer film of a titanium oxide film formed with the organic solvent dispersion according to claim 1; and a film of an inorganic compound other than titanium oxide.

20. A functional material, comprising the multilayer film of a titanium oxide film, according to claim 18.

21. A photocatalytic material, comprising the multilayer film of a titanium oxide film, according to claim 18.

22. A coating agent, characterized in that the coating agent comprises the organic solvent dispersion according to claim 1.

23. The coating agent according to claim 22, characterized in that the coating agent is used to form a titanium oxide film having a coverage of a substrate with flaky titanium oxide particles of 90% or more.

24. The coating agent according to claim 22, characterized in that the coating agent is used to form a monolayer film of flaky titanium oxide particles.

25. The coating agent according to claim 22, characterized in that the coating agent is used to form a titanium oxide film having a thickness of 2 nm or less.

26. The coating agent according to claim 22, characterized in that the coating agent is used to form a titanium oxide film having stacked monolayer films of flaky titanium oxide particles.

27. The coating agent according to claim 26, characterized in that the coating agent is used to form the titanium oxide film having a stacked film thickness in the range of 1 to 20 nm.

28. A method for production of a titanium oxide film, characterized in that the method comprises coating a base material with the organic solvent dispersion according to claim 1 and then irradiating the base material with light having a wavelength having energy equal to or more than a band gap of titanium oxide thereto to form a film.

29. A method for production of a multilayer film of a titanium oxide film and a polymer film, characterized in that the method comprises alternately coating a base material at least once with the organic solvent dispersion according to claim 1 and a polymer solution.

30. A method for production of a multilayer film of a titanium oxide film and an inorganic compound film, characterized in that the method comprises alternately coating a base material at least once with the organic solvent dispersion according to claim 1 and a dispersion of a flaky inorganic compound other than titanium oxide and then forming a film at a temperature in the range of 5 to 500° C.

31. A method for production of a titanium oxide film, characterized in that the method comprises repeating at least twice an operation involving coating a base material with the organic solvent dispersion according to claim 1 and then forming a film at a temperature in the range of 5 to 500° C. to stack monolayer films of flaky titanium oxide particles.

32. The method for production of the titanium oxide film according to claim 31, characterized in that a thickness of the stacked films is 1 to 20 nm.

33. A method for production of a titanium oxide film, characterized in that the method comprises coating a base material with the organic solvent dispersion according to claim 1 and then forming a film at a temperature in the range of 5 to 500° C.

34. The method for production of the titanium oxide film according to claim 33, characterized in that a coverage of the base material with the flaky titanium oxide particles is 90% or more.

35. The method for production of the titanium oxide film according to claim 34, characterized in that the film is a monolayer film of the flaky titanium oxide particles.

36. The method for production of the titanium oxide film according to claim 34, characterized in that the film has a thickness of 2 nm or less.

* * * * *